United States Patent

Harao et al.

[11] 3,944,880
[45] Mar. 16, 1976

[54] CATHODE RAY TUBE DEVICE OF PREHEATED TYPE

[75] Inventors: Norio Harao; Yoshiharu Obata, both of Yokohama; Tatsuo Yamaguchi, Machida, all of Japan

[73] Assignee: Tokyo Shibaura Electric Co, Ltd., Kawasaki, Japan

[22] Filed: May 13, 1974

[21] Appl. No.: 469,505

[30] Foreign Application Priority Data
May 15, 1973 Japan.................................. 48-53138
May 16, 1973 Japan.................................. 48-53516

[52] U.S. Cl.................................. 315/380; 315/381
[51] Int. Cl.²......................................... H01J 29/70
[58] Field of Search...................... 315/381, 380, 379

[56] References Cited
UNITED STATES PATENTS
3,510,722  5/1970  Curtis .................................. 315/380
3,535,445  10/1970  Griffery ............................. 315/381

*Primary Examiner*—Malcolm F. Hubler
*Attorney, Agent, or Firm*—Oblon, Fisher, Spivak, McClelland & Maier

[57] ABSTRACT

A cathode ray tube device includes a cathode ray tube of which cathode is heated in a waiting state as well as a normal operating state to emit an electron beam. The emitted electron beam in the waiting state is prevented from impinging the fluorescent surface of the tube by supplying a predetermined voltage or current independent of a signal for the normal operation to the grid of an electron gun assembly or a deflecting device.

6 Claims, 10 Drawing Figures

CATHODE RAY TUBE DEVICE OF PREHEATED TYPE

BACKGROUND OF THE INVENTION

This invention relates to a cathode ray tube device of a preheated cathode type including a cathode ray tube and an electric circuit to operate the tube.

In a conventional cathode ray tube device of such a type, an electron beam emitted from a heated cathode has been kept in a cut-off state during a waiting time, by suppling a certain voltage to the first grid of an electron gun assembly. Upon the starting of the cathode ray tube, the cut-off state is released to rapidly start the cathode ray tube in a stable condition. The maintenance of such a cut-off state causes the cathode to be deteriorated, resulting in the shorter life time.

SUMMARY OF THE INVENTION

The object of the invention is to provide a preheated type cathode ray tube device which may be quickly operated and allow the cathode to have a longer life time.

According to the invention the cathode ray tube device comprises a cathode ray tube having a tube with a face plate, an electron gun assembly including first and second grids and a cathode from which an electron beam is emitted and operating means including an anode and a deflecting member assembly for allowing the electron beam to scan the face plate in a normal operating state of the device, and an electric circuit for driving said operating means, including a heater power source for heating the cathode in the normal operating state of the device and a waiting state of the device in which the electron beam does not scan the face plate, the cathode ray tube device further including introducing means for introducing the electron beam from the cathode without scanning the face plate by the electron beam while the device is kept in the waiting state. The cathode ray tube described above may be consist of a fiber optics cathode ray tube used in the facsimile, or the other type cathode ray tube used in the television or the like.

DESCRIPTION OF THE PREFERRED EMBODIMENT

There will now be described a preheated type cathode ray tube device according to the present invention in comparison with the prior art device for easily understanding the present invention.

Figure 1:
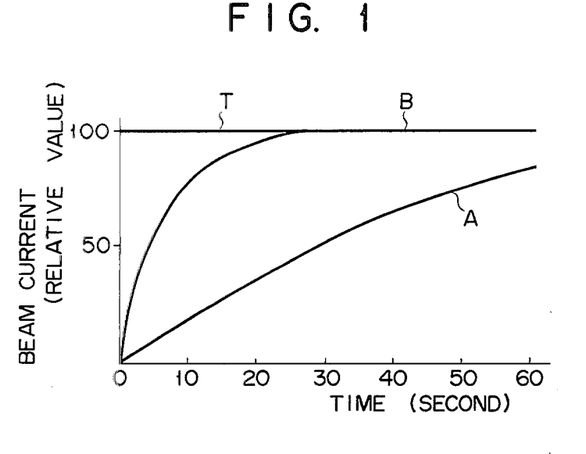
FIG. 1 is a graph showing the relationship of the amount of a beam current from the cathode of the various type cathode ray tubes to a passing time.
Figure 2:
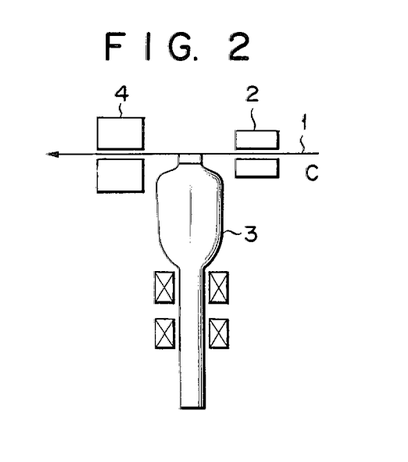
FIG. 2 shows schematically a cathode ray tube used in the facsimile.

The cathode ray tube of a preheated cathode is particularly necessitated in a field of a facsimile broadcasting employing an optical fiber tube as a cathode ray tube. The device using a cathode ray tube is generally necessary to a predetermined period till a beam current of the cathode ray tube becames in a stable condition from its starting. The variation of such a beam current to the time is in such a manner that the beam current increases as the time goes and becomes constant after a predetermined period passes as shown by curves A and B in FIG. 1. In this figure, the curves A and B respectively show the relationships in the case of a general type cathode ray tube and a televison cathode ray tube of stand-by type. In the case of facsimile, the recording section as schematically shown in FIG. 2 is necessary to be so designed that in order to attain a satisfactory picture image, the electron beam in a fiber tube 3 must be stabilized before the point of the recording paper (zinc oxide paper) 1 facing the charge point C of a charger 2 is transferred to the start up time, namely, the electron beam must be stabilized in less than two to three seconds. Consequently, it is desired that the beam current represents always a certain constant value from the starting, regardless of the time elapsed as shown by a line T in FIG. 1.

Figure 3:
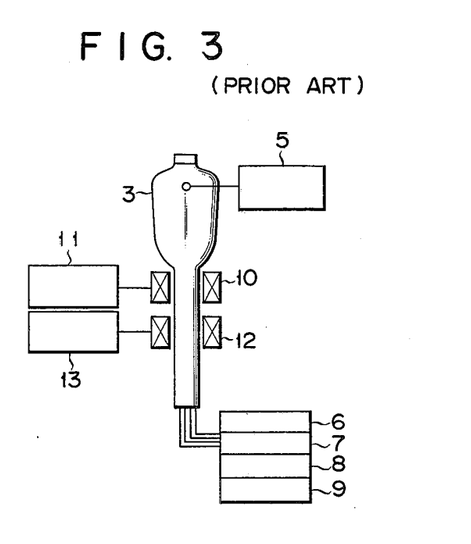
FIG. 3 is a schematical view of a fiber optics cathode ray tube device according to the prior art.

There has been known a cathode ray tube device to satisfy the demand described above, for example, as schematically shown in FIG. 3. The device comprises a fiber tube 3, a power source 5 for the anode of the fiber tube, a heater power source 6, a cathode power source 7, a first grid power source 8, a second grid power source 9, a deflection yoke 10, a focussing coil 12, a power source 11 for the yoke and a power source 13 for energizing the focussing coil. In the device having such a construction, the heater in the cathode is heated to a high temperature and the first grid of the electron gun is energized by the power source 8 to prevent the emitting of the electron beam from the cathode, i.e. to maintain a cut-off state of the electron beam prior to the normal operation, in order to rapidly start the cathode in a stable condition. However, since the cathode in the prior art device is prevented from emitting an electron beam for a long time in spite of its temperature kept high, resistant substance is created in the oxide layer of the cathode resulting in the remarkable reducing of a life time.

A preheated type cathode ray tube device according to the present invention is considered to eliminate the disadvantages described above, wherein the heater of the cathode ray tube is previously heated by the rate current flowing in the heater so that a stable electron beam may be emitted from the cathode which does not influence the fluorescent surface by additionally providing suitable means. Thus the deterioration of the cathode may be prevented.

There will now be described a cathode ray tube device of preheating type according to the invention with reference to the accompanying drawings.

Figure 4:
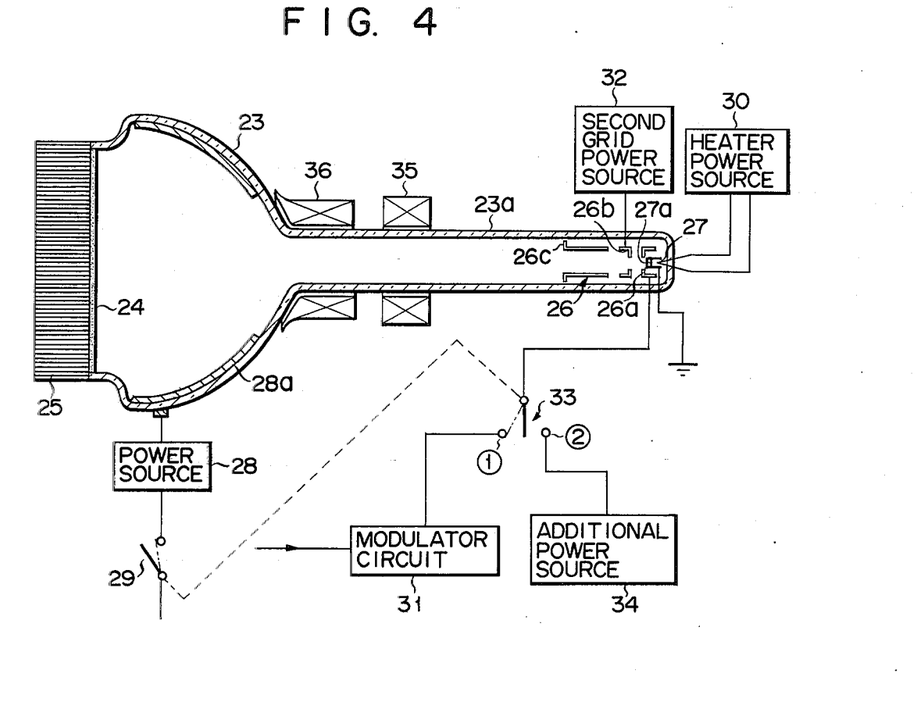
FIG. 4 schematically shows a fiber optics cathode ray tube device according to a first embodiment of the invention.

A cathode ray tube device of preheating type of a first embodiment according to the invention shown in FIG. 4 includes an optical fiber tube and an electric circuit for operating the fiber tube. The fiber tube has the same construction as the conventional one, so that its detailed structure is omitted. On one side of a tube 23 with a neck portion 23a is provided an optical fiber bundle 25 the inner side of which formes a face plate and the other side of which constitutes a recording face on which the recording paper is travelled. A fluorescent layer 24 is mounted on the face plate of the tube 23. Within the neck portion 23a a conventional electron gun assembly 26 is provided with a cathode 27 at its rear end. The cathode 27 is of an oxide type having an electron emissive layer 27a made of oxide substance, for example, BaO or $(BaSr)O_2$. On the inner surface of the funnel portion of the tube 23 is disposed an anode layer 28a which is electrically connected to a high voltage power source 28 of the electric circuit. The anode layer 28a is continued to the electron gun assembly 26 and connected to the anode 26c of the gun 26 although not shown so that both anodes are kept in the same potential. The high power source 28 is provided with a first change-over switch 29 to be selectively driven by the operation of the switch 29.

To the heater provided in the cathode 27 is connected a conventional heater power source 30 to supply a voltage to the heater to heat it thereby emitting an electron beam from the cathode. To the first and second grids 26a, 26b of the electron gun assembly 26 are respectively connected well known power source circuits 31, 32. The first circuit 31 may be a brightness modulator circuit to receive a picture signal as an input signal. The output from the circuit 31 is transmitted to the first grid 26a through the one contact side or first contact of a second change-over switch 33 connected between the power source 31 and the first grid 26a. The other contact side or second contact of the second switch 33 is connected to an additional power source 34 to supply an output signal therefrom to the first grid 26a when the second switch is thrown to the second side.

The second switch 33 may be operated in synchronism with the first switch 29 so that when the former is brought to connect the power source circuit 31 to the first grid 26a, the latter is operated so as to allow the anode 28a to be biased by its power source 28. Through the figures numeral 35 shows an electron beam focussing device and numeral 36 electron beam deflecting device which are well known in this field.

The operation of the fiber tube device described above is as follows.

Waiting state:

The second change-over switch 33 is brought to the second contact side for positively biasing the first grid 26a of the electron gun assembly 26 by the additional power source 34. The first change-over switch 29 is open in synchronism with the operation of the second switch 33 to supply no voltage to the anode 28a. The cathode 27 is heated to a predetermined temperature by passing a rectified current or an alternating current in its heater by the power source 30, so that an electron beam is emitted from the cathode and received to the second grid thereby not influencing the fluorescent surface. This electron beam emitting condition where the emitting current density of the cathode surface is 5 mA to 100 mA/cm$^2$ is kept till the device is normally operated.

Normal operating state:

The second change-over switch 33 is thrown on its first contact side from the second contact side to connect the first grid 26a to the power source circuit 32 thereby supplying a voltage of a predetermined value. That is, the first grid 26a is supplied with a picture signal modulated by a suitable amplifier circuit not shown to modify the electron beam emitted from the cathode in the same manner as the conventional fiber tube. The first switch 29 is closed to connect the power source 28 to the anode 28a by the changing of the second change-over switch 33. The fiber tube device may be normally operated in such a manner that the modulated electron beam is accelerated by the anode 28a and the second grid 26b biased by respective power sources 28, 32.

The fiber tube device described above has the following advantages. Since during the waiting time the electron beam emitted from the cathode is received by the second grid of the electron gun assembly to allow the cathode to be kept in the same condition as the normal operation, the resistive layer which is apt to be formed on the oxide layer of the cathode according to the prior art is not created thereby causing the cathode to have a long life time. The device may be instantly operated in a stable state for recording when the recording paper is transferred and first and second switches are simultaneously operated to bring the anode and the first grid to a normal recording since the electron beam has been emitted from the cathode in a stable state before a normal recording operation is started.

Figure 5:
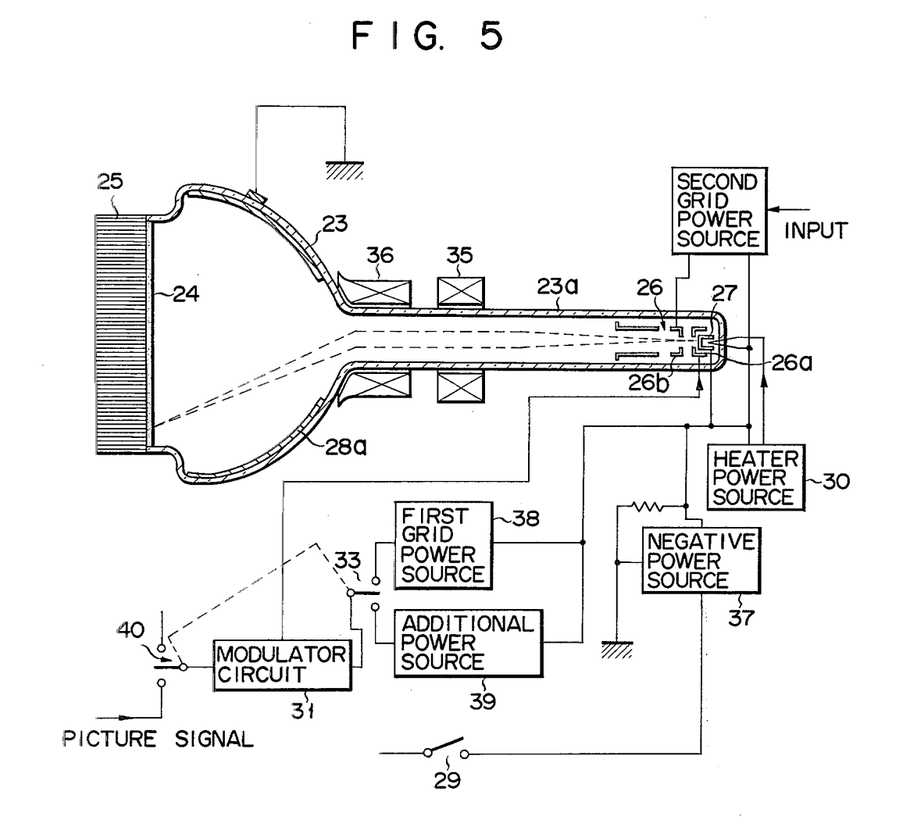
FIG. 5 shows a fiber optics cathode ray tube device according to a second embodiment.

FIG. 5 shows a fiber tube device according to the second embodiment, in which a fiber tube has the same construction as that of the first embodiment, so that its detailed description is omitted.

In the device, a negative heater power source 30 is connected to the heater of a cathode 27 disposed in the neck portion 23a of a tube 23 to heat the cathode to a predetermined temperature. One terminal of the power source 30 is also connected to the cathode 27 and the output terminal of a negative high voltage power source circuit 37 for the tube, so that the cathode 27 and its heater may be kept in the same high negative potential. The output terminal of the power source 37 is also connected to the respective input sides of first and second power source circuits 38, 39 for a first grid, of which one 38 is suitable for a normal operation and the other 39 for a waiting operation. The main power source 37 is provided with a first switch 29 on its input side. A change-over switch 33 is provided on the output side of both circuits 38, 39 in such a manner that both fixed contacts are respectively connected to the respective output terminals of the circuits 38, 39. The movable contact of the change-over switch 33 is connected to one input terminal of a brightness modulator circuit 31 of which the other input terminal is connected to a third switch 40. The output terminal of the modulator circuit 31 is connected to the first grid 26a of an electron gun assembly 26. The second grid 26b of the electron gun assembly 26 is connected to one terminal of a power source circuit 32 for a second grid, the other terminal of which is connected to the negative high voltage power source 37 which is connected to the cathode.

Said three switches 29, 33, 40 are so connected to one another that when the first switch 29 is open, the movable contact of the second switch 33 is connected to the fixed contact connected to the waiting power circuit 39 and the third switch 40 is open (waiting state), while when the first switch 29 is closed, the movable contact of the second switch is connected to the other fixed contact thereof and the third switch 40 is closed (normal operating state). These three switches may be operated in synchronism with one another by suitable connecting means not shown.

With such a fiber tube device, the waiting operation is made as described below.

All switches 29, 33, 40 are brought in the waiting condition, so that the first grid 26a is biased with a sum of voltage impressed by both the negative high power source 37 and the first grid power source 39. The cathode is heated by its heater supplied with a voltage by the power source 30 and the second grid 26b is also energized by its power source 32. Consequently, the electron beam is emitted from the cathode 27 in the same state as the normal one, and then received by the second grid 26b without scanning a fluorescent surface 24 of the fiber tube.

When all switches 29, 33, 40 are changed to their normal states to allow the fiber tube to start the recording operation, the catode has a high negative potential against the earthed anode of the fiber tube by the main power source 37 through the closed switch 29. The change-over of the second and third switches 33, 40 causes the first grid 26a to be supplied with a voltage by the first grid power source 38 and a signal which is made by modifying the picture signal transmitted through the closed third switch 40 at the brightness modifying circuit 31. Thus simultaneously with the operation of the switch, the beam emitted from the cathode is directed to the fluorescent surface and scans it while modified by the first grid, in the same manner as in the conventional fiber tube.

Although the fiber tube devices illustrated in reference to FIGS. 4 and 5 are so designed that the electron beam emitted from the cathode is received by the second grid of the electron gun assembly, other means may be used for preventing the emitted electron beam from impinging the fluorescent surface, for example, as described below.

Figure 6:
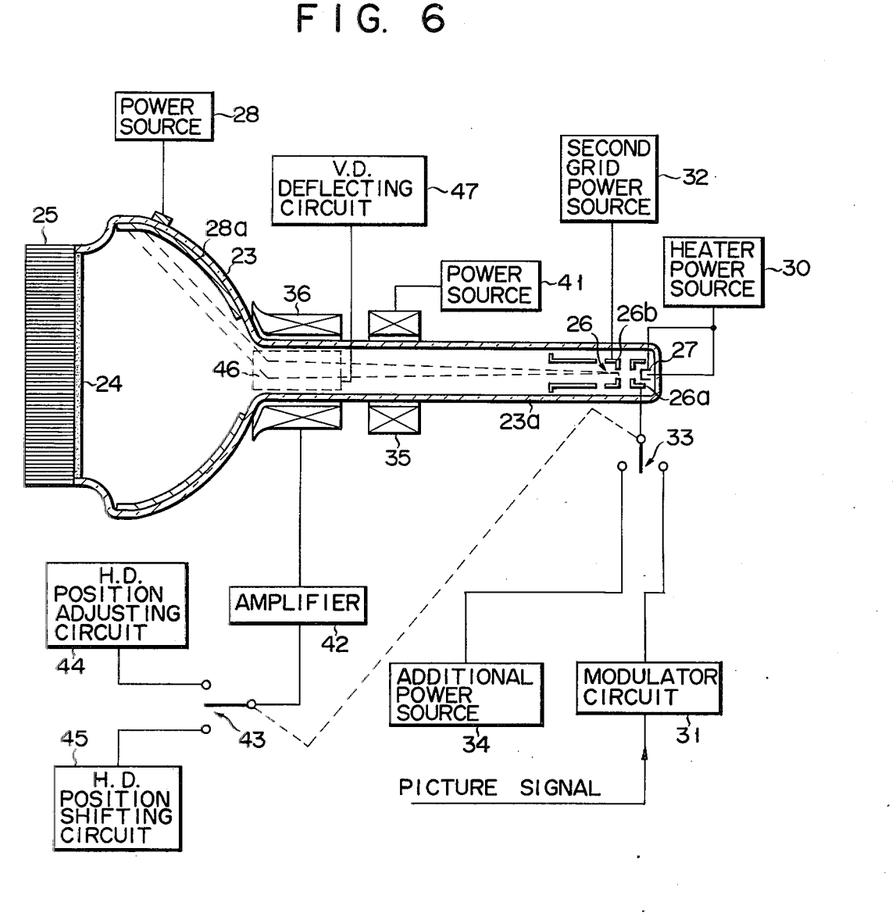
FIGS. 6 to 8 show other embodiment of the present invention.

In a third device according to the third embodiment shown in FIG. 6, an electron beam focussing device 35 disposed around the neck portion 23a of a glass tube 23 is supplied with a power source circuit 41 connected thereto so as to focus an electron beam passing in the tube. A deflecting device 36 is positioned around the neck portion 23a at the forward end and connected to the output side of a deflecting amplifying circuit 42. The input side of the amplifying circuit 42 is provided with a change-over switch 43, the movable contact of which is connected to the input terminal of the circuit 42. The first fixed contact is connected to a horizontal deflecting position adjusting circuit 44, and the second fixed contact to a horizontal deflecting position shifting circuit 45. At the forward end of the neck portion is further mounted a vertical deflecting device 46 which is energized by a vertical deflecting circuit 47 connected thereto. The change-over switch 43 may be operated in synchronism with another switch 33 so that when the position adjusting circuit 44 is connected to the amplifier 42, the first grid 26a of an electron gun assembly 26 is biased with a brightness modulator circuit 31 (normal operating state), while when the position shifting circuit 45 is associated with the amplifier 42, the first grid 26a is energized by an additional power source 34 (waiting state).

In the same construction as the aforementioned embodiments, the heater of a cathode 27 is connected to its power source 30, the second grid 26b of the electron gun assembly 26 to its power source 32, and the anode of the tube 23 to its power source 28.

Figure 9:
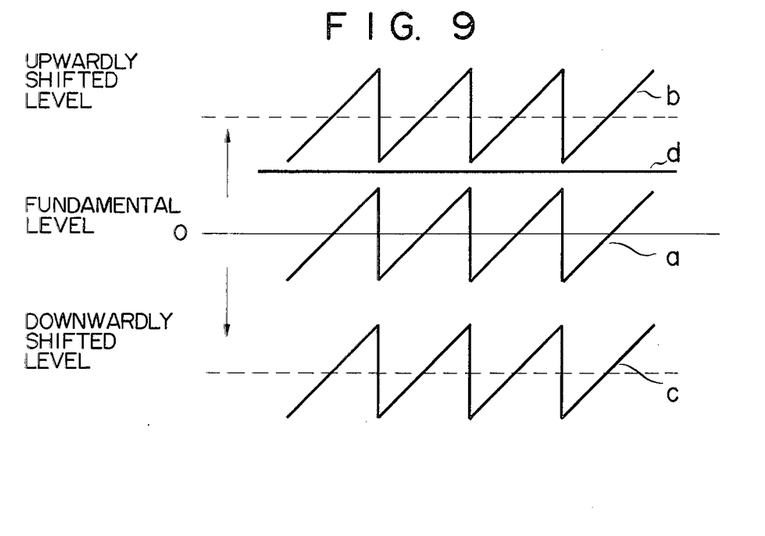
FIG. 9 shows wave forms of the signals supplied to the beam deflecting device of the fiber optics cathode ray tube shown in FIGS. 6 to 8.

Normal operating state:

The heater is heated by a directing or alternating current of about 6.3V to emit an electron beam from the cathode 27. The first change-over switch 33 is brought to a position in which the first grid 26a is connected to the main circuit 31 to receive a picture signal on which a modulated signal has been superposed. The second grid 26b is impressed with a predetermined voltage of about 400V to accelerate said emitted beam. The beam is further accelerated by the anode 28a to impinge the fluorescent surface 24. The electron beam is focussed by focussing coil 35 and deflected by the deflecting yokes 36, 46 on its advancing way so as to scan the fluorescent surface 24. The second change-over switch is previously brought to a first position in which its movable contact is connected to the first fixed contact. Consequently, a signal having a sawing wave as shown by a curve a in FIG. 9 flows to the amplifier 42 from the horizontal deflecting position adjusting circuit 44 through the switch 43, and thus the amplified signal is supplied to the horizontal deflecting device 36 to horizontally deflect the beam. The beam may be also deflected in a vertical direction by the other deflecting circuit 47.

Waiting state:

The electron beam is emitted from the cathode 27 in the same manner as the normal operating state. The switch 33 is thrown to the other position wherein the additional power source 34 is connected to the first grid 26a to supply a bias directing current to the first grid 26a. The second grid 26b of the electron gun assembly 26 is biased with a voltage of 400V thereby accelerating the emitted beam. The switch 43 is also changed to connect the horizontal deflecting position adjusting circuit 45 to the amplifier 42 so that a signal of sawing wave having a different level from that of the normal signal (curve a) as shown by curves b, c in FIG. 9. Accordingly the electron beam is deflected enough not to impinge the fluorescent surface 24.

Figure 7:
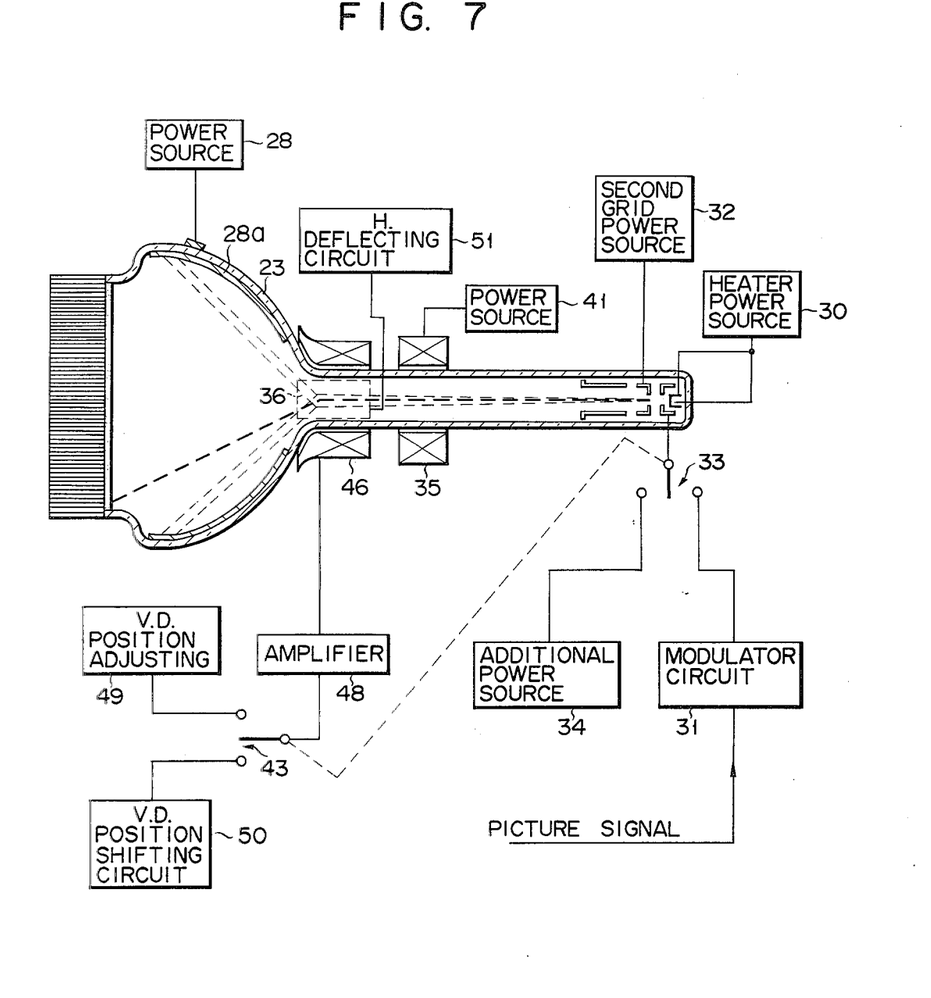

A fiber tube device according to a further embodiment schematically shown in FIG. 7 has a similar construction to the device shown in FIG. 6 except that an additional power circuit is provided in relation to the vertical deflecting device. That is, to a vertical deflecting device 46 is connected the output side of a vertical deflecting signal amplifier 48. On the input side of the amplifier 48 is provided a vertical deflecting position adjusting circuit 49 and a vertical deflecting position shifting circuit 50 through a change-over switch 43 so that in the normal operating state the former circuit 49 is connected to the amplifier 48, while in the waiting state the latter circuit 50 to the amplifier 48. A horizontal deflecting device 36 is connected to a horizontal deflecting circuit 51.

Figure 8:
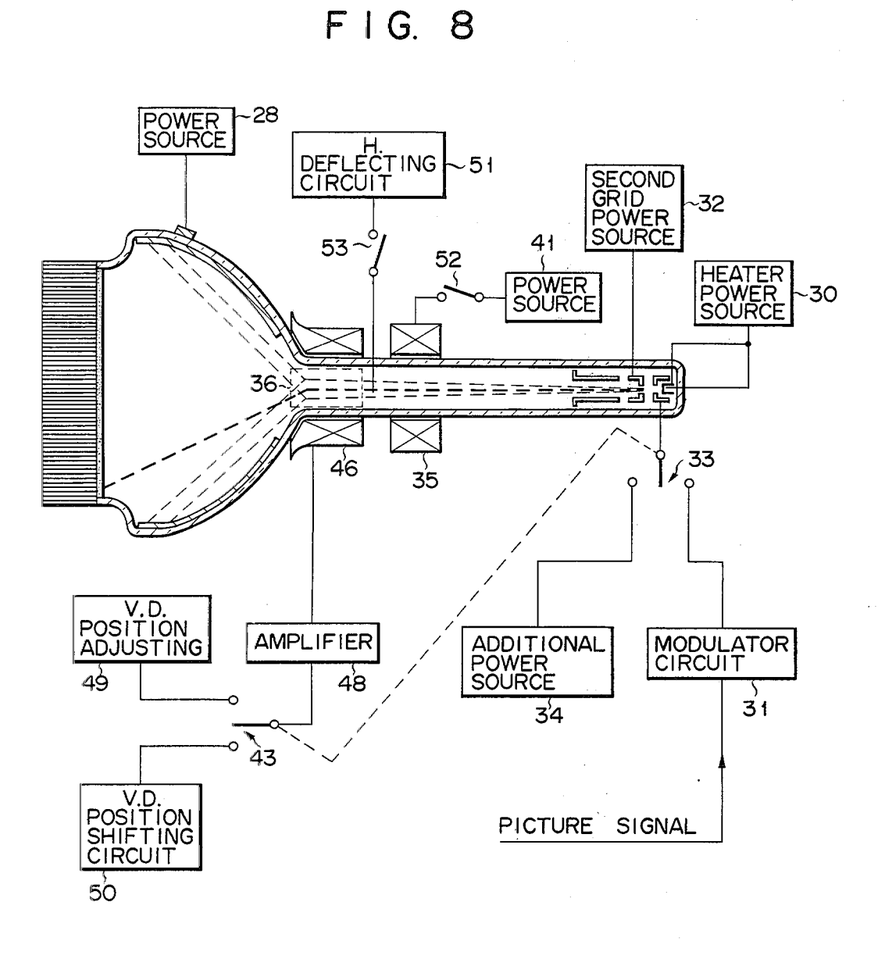

A fiber tube device as shown in FIG. 8 has a similar construction to the device as shown in FIG. 7 except that two additional switches 52, 53 are respectively provided on the output side of a focussing power source 41 and a horizontal deflecting power source 51. These switches 52, 53 are operated in synchronism with the other switches 33, 43 in such a manner that the former switches are closed when the latter switches are brought to a normal operating condition.

With the latter devoce, the horizontal deflecting device 36 and the focussing device 35 are not energized when the device is brought into a waiting state, so that the power loss in the focussing device 35 and the horizontal deflecting device 36 may be eliminated.

Figure 10:
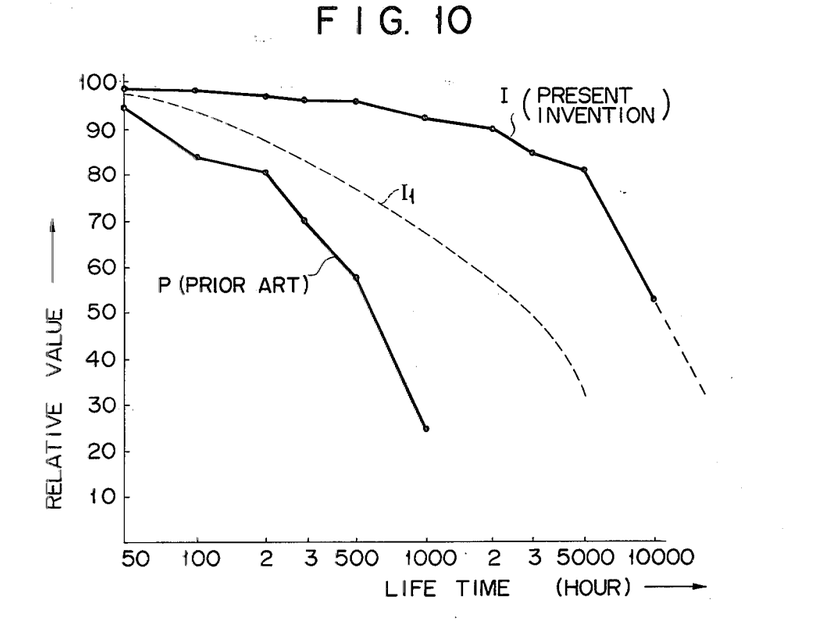
FIG. 10 is a graph showing the comparison of the life time of the cathode between the present invention and the prior art.

As described above, the fiber tube device of the present invention has such an advantage as compared with the conventional one that the cathode in the former represents a longer life time than that in the latter. FIG. 10 shows the measuring results of the life time of the cathode in the device according to the present invention and prior art in which a curve I relates to the present invention and a curve P to the prior art. In this measurement there was used a cathode with an oxide substance of 6.3V/150 mA rate through which a rate current is kept to flow in a waiting state. It is easily understood that a life time in the prior art shown by the curve P becomes rapidly low as time passes and indicates 750 hours in the state where the relative value is $i/e \doteqdot 37\%$, while, that in the present invention shown by the curve I slowly decreases and indicates 10,000 hours at the same state.

In the device of the present invention it is preferable to employ a beam current of 5 to 100 mA/cm$^2$ current density on the cathode surface. The electron density is larger, the interface resistivity generated in the cathode is more increased while the electron density is smaller, the oxide substance such as barium oxide is consumed more, both resulting in the lower life time of the cathode. If the beam current density is 5 or 100 mA/cm$^2$, the life time of the cathode exhibits as shown by a curve $I_1$ in FIG. 10.

What we claim is:

1. In a cathode ray tube device including a cathode ray tube having a tube with a faceplate, an electron gun assembly including first and second grids and a cathode from which an electron beam is emitted and operating means including an anode and deflecting means for allowing the electron beam to scan the faceplate in a normal operating state of the device, and an electric circuit for driving said operating means, including a heater power source for heating the cathode in the normal operating state of the device and a waiting state of the device where the electron beam does not scan the faceplate, the improvement which comprises introducing means for introducing the electron beam from the cathode without scanning the faceplate by the electron beam while the device is kept in the waiting state and wherein the cathode ray tube consists of a fiber optics cathode ray tube including a fluorescent surface on the faceplate on one side of an optical fiber bundle and the cathode has an electron emissive layer made of oxide layer emitting a beam current of 5 to 100 mA/cm$^2$ density.

2. A cathode ray tube device according to claim 1 wherein said electric circuit includes a main first grid power source for biasing the first grid: and said introducing means includes an auxiliary first grid power source in the waiting state so connecting the first grid to the main first grid circuit in the normal operating state, and for connecting the first grid to the auxiliary first grid power source in the waiting state so that the electron beam emitted from the cathode is received to the second grid.

3. A cathode ray tube device according to claim 2 wherein the electric circuit includes an anode power source and an additional switch for connecting the anode to the anode power source in the normal operating state.

4. A cathode ray tube device according to claim 2 wherein the deflecting means includes a horizontal deflecting member and a vertical deflecting member; and the electric circuit includes a horizontal deflecting adjusting circuit, a horizontal deflecting shifting circuit and a switch for selectively connecting the horizontal deflecting member to one of the horizontal deflecting adjusting and shifting members.

5. A cathode ray tube device according to claim 4 wherein the operating means includes a focussing member; and an electric circuit includes a focussing power source, a vertical deflecting power source and two switches for connecting the focussing and vertical deflecting members to their power sources during the normal operating state.

6. A cathode ray tube device according to claim 2 wherein the deflecting means includes a horizontal deflecting member and a vertical deflecting member; and the electric circuit includes a vertical deflecting adjusting circuit, a vertical deflecting shifting circuit and a switch for selectively connecting the vertical deflecting member to one of the vertical deflecting adjusting and shifting members.

* * * * *